UNITED STATES PATENT OFFICE.

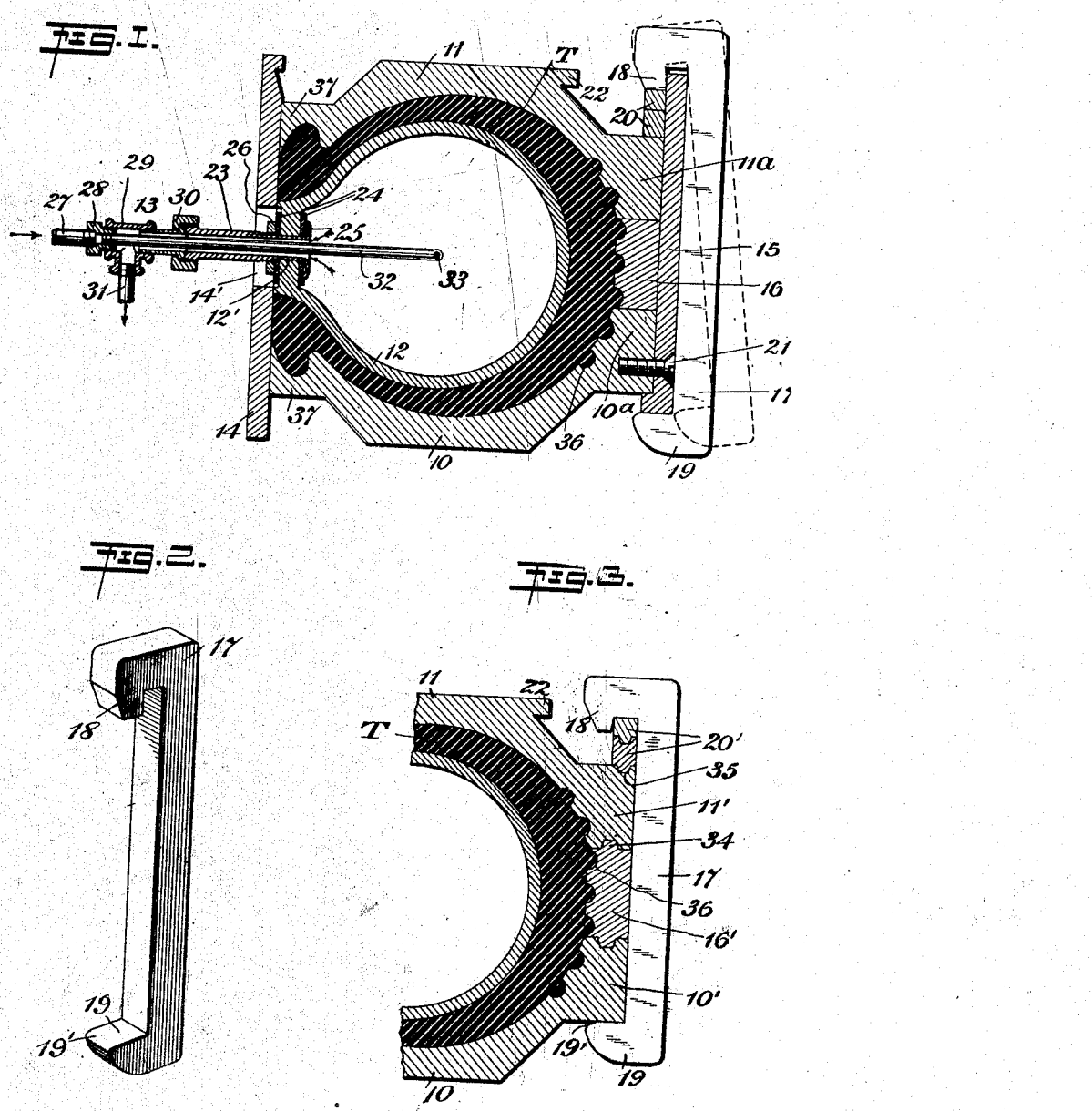

GEORGE ELLINWOOD BATCHELLER, OF NEW YORK, N. Y.

PNEUMATIC-TIRE APPARATUS.

1,175,681.   Specification of Letters Patent.   Patented Mar. 14, 1916.

Application filed February 18, 1914. Serial No. 819,385.

*To all whom it may concern:*

Be it known that I, GEORGE E. BATCHELLER, a citizen of the United States, and a resident of the city of New York, borough of Manhattan, in the county and State of New York, have invented a new and Improved Pneumatic-Tire Apparatus, of which the following is a full, clear, and exact description.

This invention relates to pneumatic tires, and has particular reference to a convenient, reliable and economical apparatus for forming, and especially repairing, pneumatic tires.

Among the objects of the invention is to provide improved facilities for operating upon tires of different sizes or types by the use of the same apparatus.

A further object of the invention is to improve the adjusting and clamping means for the apparatus in accordance with the various sizes of tires being treated.

A still further object of the invention is to provide an improved means for furnishing a pressure fluid for the flexible inner bag for coöperating with the aforesaid apparatus, the operation of which is thoroughly satisfactory and whereby a vastly larger number of cures may be had from a single pressure fluid bag than may be had by the apparatus commonly in use.

The foregoing and other objects of the invention will hereinafter be more fully described and claimed and illustrated in the drawings forming a part of this specification in which like characters of reference indicate corresponding parts in all the views, and in which—

Figure 1 is a vertical transverse section through one form of this apparatus; Fig. 2 is a perspective view of one of the set of clips used in connection with the side plates; and Fig. 3 is a modified form of certain of the parts of this invention.

The several parts of this device may be made of any suitable materials, and the relative sizes and proportions, as well as the general design of the mechanism, may be varied to a considerable extent without departing from the spirit of the invention hereinafter more fully set forth and specifically claimed.

Referring to the drawings for a more particular understanding of the invention, I show at 10 a bottom side plate and at 11 an upper side plate, the two plates constituting a pair having oppositely arranged concave faces for coöperation with the sides of a tire shown at T, said side plates being adjustable toward and from each other in accordance with the various sizes or types of tires being treated.

Within the tire and between and spaced from the concave faces of the side plates 10 and 11 is a flexible pressure fluid bag 12 of any suitable tough, flexible or elastic construction. Said bag is solid or impervious throughout its length except at one point 12' where a valve 13 of peculiar construction is secured.

The side plates being adjustable toward and from each other, I provide inner and outer rings 14 and 15 constituting one of different means which might be employed for maintaining them in proper radial alinement and to prevent the bulging of the tire or the inner pressure bag therefrom or therebetween in accordance with the various adjustments which may be resorted to, in practice, of said side plates. In other words, the inner ring 14 is wide enough to substantially close the inner portions of the tire and bag, there being no opening therethrough except as shown at 14' through which the aforesaid valve projects. Likewise, the upper plate 11 may be adjusted along the outer ring 15 to a considerable distance. A tread ring 16 is preferably employed opposite the tread portion of the tire adjacent the outer rims of the side plates. Said tread rings are made in several different sizes as to width so that the operator may select that one which will correspond to the size or type of the tire being cured in any particular case.

Any suitable means may be employed to lock the side plates at the desired distances apart or snugly against the tread ring 16 with the tire in place between them. As a suitable and effective means for accomplishing this purpose I employ a series of, say, eight or ten clips 17 of the character shown in the drawings. Each clip is made preferably of a rectangular bar of metal with a hook 18 adapted to engage over the upper edge of the ring 15 and a nose 19 arranged preferably at right angles to the main portion of the clip and adapted to interlock with the lower edge of the ring 15, as shown in Fig. 1. The point 19' of the nose is preferably beveled or rounded slightly to facilitate the assemblage of the several parts.

When, however, the parts are assembled and internal pressure is applied to the tire, the action of the several rings upon the clips will render it practically impossible for the clips to become displaced. In practice the distance from the upper edge of the outer rim 10ª of the lower plate to the point of the hook 18 remains substantially constant and the space between the outer rim 11ª of the upper plate and said hook is preferably filled by one or more filler rings 20. The filler rings, therefore, are used complemental to the tread ring or rings 16. The wider the tread ring or rings, the narrower will be the filler ring or rings employed in any particular case. The hook 18 will preferably bear against or engage over the uppermost filler ring 20. The outer ring 15 may be secured permanently, if desired, to the lower plate 10 as by means of screws 21.

The upper side plate 11 may be provided with any suitable number of projecting lugs 22 for the application of a crow bar or other tool for the purpose of lifting the said upper plate after the cure is effected.

In the usual practice of curing or repairing automobile tires, the internal bag for the introduction of pressure fluid such as air, steam or water, will remain effective for a very limited number of cures due to the excessive heat required for the cure. Said bag 12 must be made of a very flexible or resilient composition in order to serve its proper purpose, and therefore the texture thereof is very easily impaired by the heat used. In order to avoid the difficulty and expense incident to the usual short life of a pressure bag 12, I employ a special form of means for introducing water to serve as the pressure fluid and to cause such water to circulate in a definite direction around the axis of the tire and emerge through the same valve mechanism, the water being supplied in a constant stream and discharged at a corresponding rate, and therefore remaining comparatively cool or at a temperature which will neither impair the virtue of the bag nor interrupt in any manner the efficiency of the heat being applied to the tire. This valve mechanism in a preferred form comprises a quill 23 fitted snugly in the hole 12' of the bag by means of metal washers 24 gripped on the opposite sides of the structure of the bag beween a flange 25 and a lock nut 26. 27 indicates a water inlet tube of any suitable nature such as flexible metal tubing connected by a nipple 28 to a T-union 29 detachably connected by a gland 30 to the outer end of said quill. An outlet pipe 31, also preferably of flexible metal tubing, is connected to and leads laterally from said T-union. A nozzle 32 is connected to the nipple 28 in alinement with the inlet pipe 27 and leads into the interior of the bag to any desired distance through the quill and sufficiently spaced therefrom to provide an outlet opening for the water between the nozzle and the quill wall leading to the pipe 31. At the inner end the nozzle is provided with a small jet hole 33 whereby the water introduced through the nozzle from the pipe 27 will be squirted tangentially of the wheel or bag from one side only of the nozzle. Since the water, therefore, is introduced into the bag in one direction only, such direction will determine the direction of circulation of the body of water which constitutes the pressure fluid within the bag. When the desired pressure is reached, the water will be discharged through the opening around the nozzle and the pipe 31 as above described, but with the desired pressure maintained and the circulation being continued during the curing of the tire.

The modification in Fig. 3 differs from the construction of Fig. 1 in the utilizing of the tread and filler rings in such a manner as to include the functions of the outer ring 15; that is to say, the tread ring or rings 16″, the rims 10′ and 11′, and also the filler rings 20′ are all arranged or formed with interengaging tongues 34 and grooves 35 whereby radial displacement of any one of them with respect to another is prevented. In this embodiment of the invention the clips which are distributed around the apparatus at suitable intervals are caused to hook over the uppermost filler ring 20′ and the plate rim 10′, as shown in Fig. 3. In either form of the invention the parts of the plates 10 and 11 and the inner surface of the tread ring may be formed with any suitable number or design of depressions for the purpose of forming non-skid projections or surfaces for the tire tread, as shown at 36. The side plates 10 and 11 are necessarily of such a stiff and substantial nature for the purposes of this apparatus that with the outer rims 10ª and 11ª thereof substantially anchored to prevent separation, no special means are necessary to prevent the spreading of the inner portions 37 thereof which abut against the inner ring 14.

Having thus described my invention, I claim as new and desire to secure by Letters Patent:—

1. The herein described pneumatic tire apparatus comprising, in combination, a pair of oppositely arranged side plates having concave opposite faces adapted to receive a tire, and having peripheral locking flanges, means to maintain said plates in proper radial alinement, means to lock said plate flanges at variously adjusted distances apart, and interchangeable tread rings of various thicknesses to fit between the outer flanges of said plates.

2. The herein described pneumatic tire apparatus comprising, in combination, a pair of relatively adjustable side plates, a tread ring fitted between the outer rims of said plates, one or more filler rings located on the outside of one of said plates, said filler rings being complemental to the tread rings maintaining a substantially uniform distance between the outer edge of the outermost filler ring and the remote edge of the tread ring, and means coöperating with the plates and rings aforesaid to lock them in operative position.

3. In a pneumatic tire apparatus, the combination of a pair of relatively adjustable side plates having tread depressions, interchangeable tread rings of various thicknesses coöperating with and fitted between said side plates at their tread portions and also having a series of depressions, means to lock the side plates and tread ring in desired position with respect to the size of the tire to be treated, and means to apply fluid pressure between said side plates, substantially as and for the purposes set forth.

4. The combination of a relatively stationary side plate, a companion side plate adjustable relatively thereto, means to maintain the said plates in constant radial alinement, means to lock said plates to prevent lateral separation during operation, and means connected to the relatively movable plate for the application of a tool to start it from the relatively fixed plate after the operation on the tire is completed.

5. In a pneumatic tire apparatus, the combination of a pair of side plates, means to maintain them in proper relative positions both laterally and radially, a flexible bag between the plates and spaced therefrom, and means extending through a single hole in said bag to introduce to and discharge from said bag a pressure fluid in a continuous stream.

6. In a pneumatic tire apparatus, the combination of a pair of relatively adjustable side plates, means to maintain the plates in proper operative position both radially and laterally, a flexible bag between the plates and spaced therefrom, and means acting through a single hole into said bag to introduce a pressure fluid to and deliver said fluid from the interior of the bag, said means including a nozzle having a jet hole extending from one side thereof so as to direct the fluid tangentially of the bag to cause circulation of the fluid in a single direction.

7. In a pneumatic tire apparatus, the combination of a flexible bag inside the tire, and means acting through a single hole into said bag to introduce a pressure fluid to and deliver said fluid from the interior of the bag, said means including a nozzle having a jet hole extending from one side thereof so as to direct the fluid tangentially of the bag to cause circulation in a single direction.

8. In a tire vulcanizing apparatus, the combination with a collapsible form adapted to be positioned interiorly of a fabric foundation or carcass of a tire to be vulcanized, of means for supplying water as a cooling agent to the interior of said collapsible form and under pressure sufficient to maintain said collapsible form and the fabric foundation or carcass in a distended condition during the vulcanizing operation, and means for conducting from the collapsible form the water which has been warmed by the absorption of heat to which the collapsible form is subjected while the tire is undergoing vulcanization.

9. In a tire vulcanizing apparatus, the combination with a collapsible form adapted to be positioned within a fabric foundation or carcass to be vulcanized, of a liquid feeding and circulating device embodying concentric tubes one of which tubes extends interiorly of said collapsible form, and means connected to said interiorly extending tube for supplying to said collapsible form a liquid under pressure sufficient to maintain said form and the fabric foundation or carcass in a distended condition during vulcanizing, the other of said concentric tubes being in communication with the chamber of said collapsible form and providing an outlet for liquid, the temperature of which is raised by the absorption of heat from the collapsible form during vulcanization of the tire.

In testimony whereof I have signed my name to this specification in the presence of two subscribing witnesses.

GEORGE ELLINWOOD BATCHELLER.

Witnesses:
   Jos. Robinson,
   I. L. Donner.